United States Patent [19]  [11] Patent Number: 4,919,526
Umekawa et al.  [45] Date of Patent: Apr. 24, 1990

[54] ELECTRICALLY SWINGABLE DOOR MIRROR

[75] Inventors: Akihiko Umekawa, Sagamihara; Yoshihiko Ishiyama, Isehara, both of Japan

[73] Assignee: Ichikoh Industries Ltd., Tokyo, Japan

[21] Appl. No.: 263,313

[22] Filed: Oct. 27, 1988

[30] Foreign Application Priority Data

Oct. 27, 1987 [JP] Japan ................................ 62-163208
Nov. 30, 1987 [JP] Japan ................................ 62-181161
Nov. 30, 1987 [JP] Japan ................................ 62-181162
Nov. 30, 1987 [JP] Japan ................................ 62-181163
Nov. 30, 1987 [JP] Japan ................................ 62-181164

[51] Int. Cl.$^5$ .............................................. G02B 5/08
[52] U.S. Cl. .................................. 350/604; 350/637; 350/639; 248/900
[58] Field of Search ............... 350/604, 605, 632, 637, 350/639; 248/900, 479, 480, 486

[56] References Cited

U.S. PATENT DOCUMENTS 4,786,156 11/1988 Kotani et al. ...................... 350/637

FOREIGN PATENT DOCUMENTS 59236594 6/1986 Japan ................................. 350/604
6077256 4/1987 Japan ................................. 350/637

Primary Examiner—Bruce Y. Arnold
Assistant Examiner—J. Ryan
Attorney, Agent, or Firm—Foley & Lardner, Schwartz, Jeffery, Schwaab, Mack, Blumenthal & Evans

[57] ABSTRACT

A center shaft is erected from a base fixed to the car body. When a planet gear driven by a motor runs round a sun gear fixed to the center shaft, a mirror housing can be swung. The mirror housing is supported at both ends of the center shaft and a driver system comprises plural stepped gears attached to two parallel shafts, respectively, in series and engaged with one another.

6 Claims, 5 Drawing Sheets

ELECTRICALLY SWINGABLE DOOR MIRROR

BACKGROUND OF THE INVENTION

1. Field of the Invention

The present invention relates to a door mirror for use with vehicles and more particularly, it relates to a door mirror of the electrically swingable type wherein a mirror housing projected outside the car body can be automatically swung and collapsed along the car body by remote control in the car room.

2. Prior Art

Door mirrors for use with vehicles are usually attached to the car body, projecting outside the car body. The mirror for use in the door mirror is a plane mirror or mirror having a small curvature. In addition, that position of the door mirror which is attached to the car body is near to the visual point of the driver. In order to get the same rear sight as in the case of the fender mirrors whose mirrors are of the convex type, therefore, it is needed that the mirror in the door mirror is made larger-sized. The door mirror housing in which the mirror is housed is thus large-sized and this results in that the door mirrors are projected outside the car body.

When the door mirrors are projected outside the car body like this, however, there is a danger that matters and persons may contact the door mirrors to cause unexpected accident while driving the car.

Further, when cars or vehicles provided with the door mirrors are to be transported, they occupy larger space because of their door mirrors and this makes their transportation cost higher. In addition, their door mirrors sometimes hinder them from coming into and out of garages.

In order to solve these problems, preliminarily-opened Japanese Utility Model Application Sho 61-125849 has proposed a door mirror of the electrically swingable type. FIG. 1 shows the door mirror of this type.

According to the door mirror, a mirror housing 1 is swingably pivoted on a center shaft 3 which is fixed to a base 2, and it is swung, relative to the base 2, round the center shaft 3 by a driver system which includes a motor 4 arranged in the mirror housing 1. The mirror housing 1 is thus collapsed toward and along the car body. More specifically, when the motor 4 rotates, a sun-and-planet gear 6 which serves as the clutch system at the upper portion of the mirror housing is rotated through a speed reduction system in a case 5 to run round a sun gear 7 which is fixed to the upper portion of the center shaft 3. The mirror housing 1 is thus swung relative to the base 2.

The support of the mirror housing 1 and base 2 is attained in such a way that a bearing section 8 of the case 5 in which the driver system in the mirror housing 1 is housed is fitted onto a cylindrical shaft section 10 of a shaft holder 9, which is fixed to the base 2, through a washer 11. This causes the case 5 which houses the driver system therein to be supported only the bearing section 8 of the shaft holder 9 arranged on the base 2. In other words, the case 5 is supported in the cantilever manner. When the car vibrates, therefore, the mirror housing 1 resonates with the vibration of the car, thereby making it difficult to see rear sight through the door mirrors.

Further, the sealing between the bearing section 8 and the cylindrical shaft section 10 is not sufficient. Therefore, there is the possibility that grease injected into the case 5 to smooth the driver system leaks outside from between the bearing section 8 and the cylindrical shaft section 10 of the shaft holder 9.

Furthermore, the driver system housed in the case 5 includes the speed reduction system which comprises five stages of gears connected to the motor, as shown in FIG. 2. A large-diameter gear 12, small-diameter gear 13 and shaft 14 are combined one another as a unit and the same thing can be said about other gears. The small-diameter gear 13 is engaged with the large-diameter gear 12 of the next stage while a small-diameter gear 15 of the final stage is engaged with a gear 6a of planet gear means 6. This means that the speed reduction system includes many shafts and bearing sections for the gears. Therefore, engaging errors are likely to be created between the gears. This hinders the gears from being smoothly rotated and thus causes noises. In addition, the speed reduction system must be large-sized.

Two planet gears 6a and 6b which also serves as the clutch system are made concave and convex on their opposite faces, which make them engageable with each other. They are urged by a compression spring 16 and a push nut 17 and engaged with each other at their concave and convex faces. When overload is applied to the upper planet gear 6b, the upper planet gear 6b runs idle relative to the lower planet gear 6a to thereby prevent the driver system from being damaged. The upper planet gear 6b is lifted in this case while rotating and the coil spring 16 is thus rotated to rotate the push nut 17. As the result, the push nut 17 comes out of a shaft 18 because clearance between the push nut 17 and the shaft 18 is made larger.

SUMMARY OF THE INVENTION

A door mirror of the electrically swingable type according to the present invention comprises a base fixed to the car body, a center shaft attached to the base, a mirror housing attached to the center shaft and swingable round the center shaft, a mirror supported in the mirror housing in such a way that its angle can be adjusted, a sun gear attached to the center shaft, and a driver system having a planet gear engaged with the sun gear to swing the mirror housing relative to the base through the planet gear, wherein the mirror housing is supported at both ends of the center shaft by intermediate and bottom walls of a case which houses the driver system in the mirror housing.

The driver system includes a drive motor, a first gear group comprising a stepped gear engaged with a gear fixed to a drive motor shaft, other plural stepped gears including this stepped gear and combined with one another and fixed to a first shaft, and a sun-and-planet gear group comprising plural stepped gears combined with one another and fixed to a second shaft, keeping the lowest stepped gear engaged with the sun-and-planet gear in the first gear group.

The case which houses the driver system therein has a cylindrical bearing section at the lower portion thereof and this cylindrical bearing section is rotatably fitted onto a cylindrical shaft section projected from the base. A ring-shaped groove is formed on the inner wall of the cylindrical bearing section at the lower end thereof and an O-ring is fitted into the groove. The groove is then sealed by a washer from below.

A clutch system for absorbing overload to prevent the driver system from being damaged includes a sun gear rotatably attached to the center shaft, a fixing member fixed to the center shaft, said sun gear and fixing member being engaged with each other at their opposite faces, a washer fitted, unrotatable, onto the center shaft and mounted on the sun gear, and a compression coil spring arranged between the washer and a push nut fixed to the upper portion of the center shaft.

According to the present invention, the mirror housing is supported on the base at both ends thereof through the case in which the driver system is housed. Even when the vibration of the car body is transmitted to the mirror housing, therefore, the mirror housing is not so vibrated as to make it difficult to see rear sight through the mirror.

The speed reduction system employed in the driver system comprises a combination of first and second gear groups, each group including plural stepped gears fixed to a shaft. Therefore, manufacturing errors can be reduced relating to these gears arranged as described above, thereby causing less noise. In addition, these gears enable the speed reduction system to be smaller-sized.

The O-ring is interposed between the cylindrical bearing section at the lower portion of the case and the shaft section of the shaft holder rotatably fitted into the cylindrical bearing section. Therefore, it can be prevented that oil in the case leaks outside from between the cylindrical bearing section and the shaft section to spoil the mirror and make the swinging of the mirror not smooth.

The washer for supporting the compression coil spring in the clutch system is unrotatably fitted onto the center shaft. Therefore, the coil spring does not rotate following the washer when the clutch system is under operation, thereby preventing the push nut on the coil spring from coming out of the center shaft.

An object of the present invention is therefore to provide a door mirror of the electrically swingable type wherein the mirror housing does not resonate with the vibration of the car body.

Another object of the present invention is to provide a door mirror of the electrically swingable type provided with a driver system simpler in construction, smaller in size and more excellent in workability, without any errors being caused between gears when they are engaged with each other.

A further object of the present invention is to provide a door mirror of the electrically swingable type capable of preventing grease in the case from leaking outside.

A still further object of the present invention is to provide a door mirror of the electrically swingable type capable of preventing the rotation of a coil spring in the clutch system and thus preventing a push nut from coming out of the center shaft to damage the clutch system.

These and other objects as well as merits of the present invention will become apparent from the following detailed description with reference to the accompanying drawings.

DETAILED DESCRIPTION OF THE PREFERRED EMBODIMENT

Figure 1:
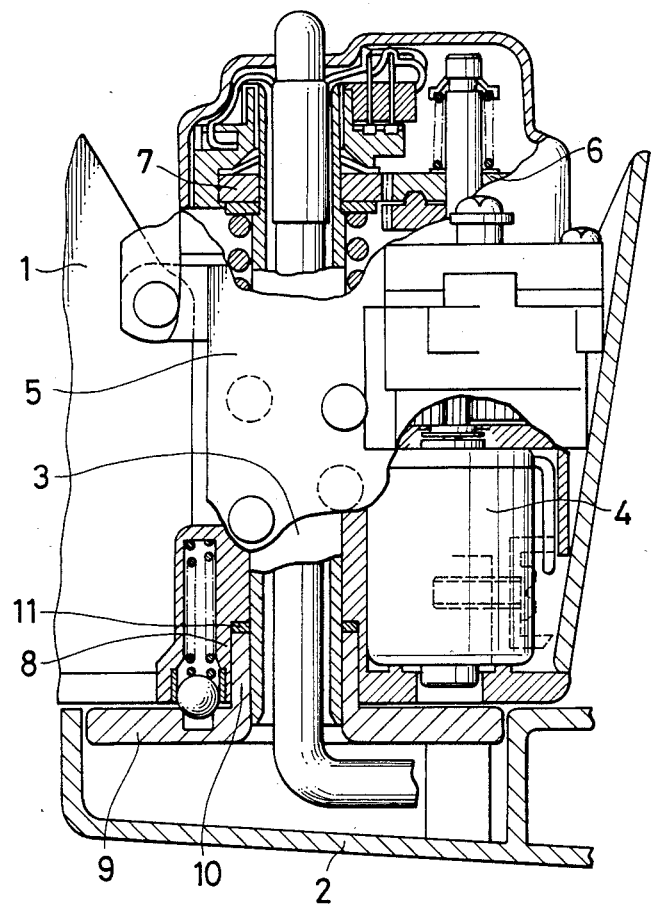
FIG. 1 shows the conventional door mirror of the electrically swingable type partially sectioned.
Figure 2:
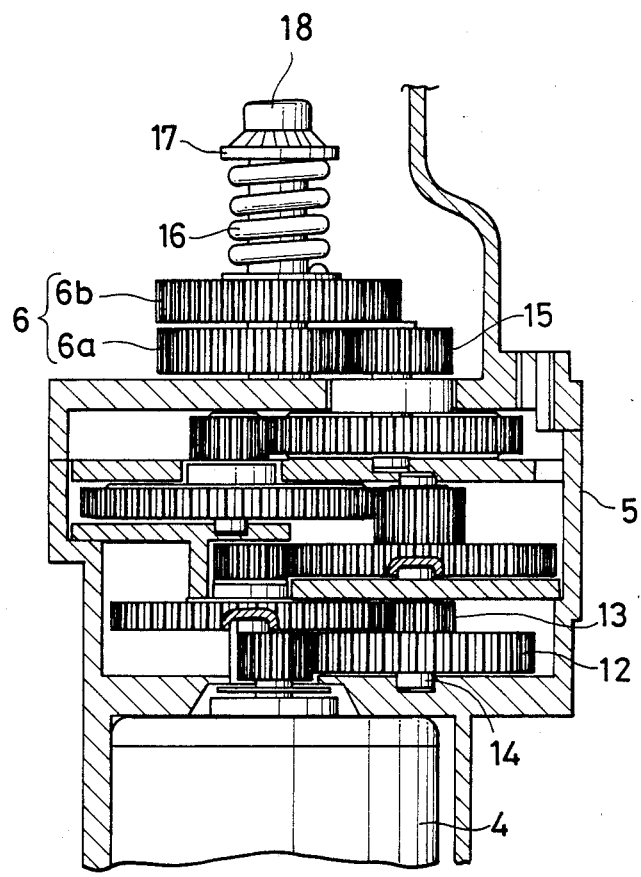
FIG. 2 is a sectional view showing a speed reduction system for the door mirror shown in FIG. 1.
Figure 3:
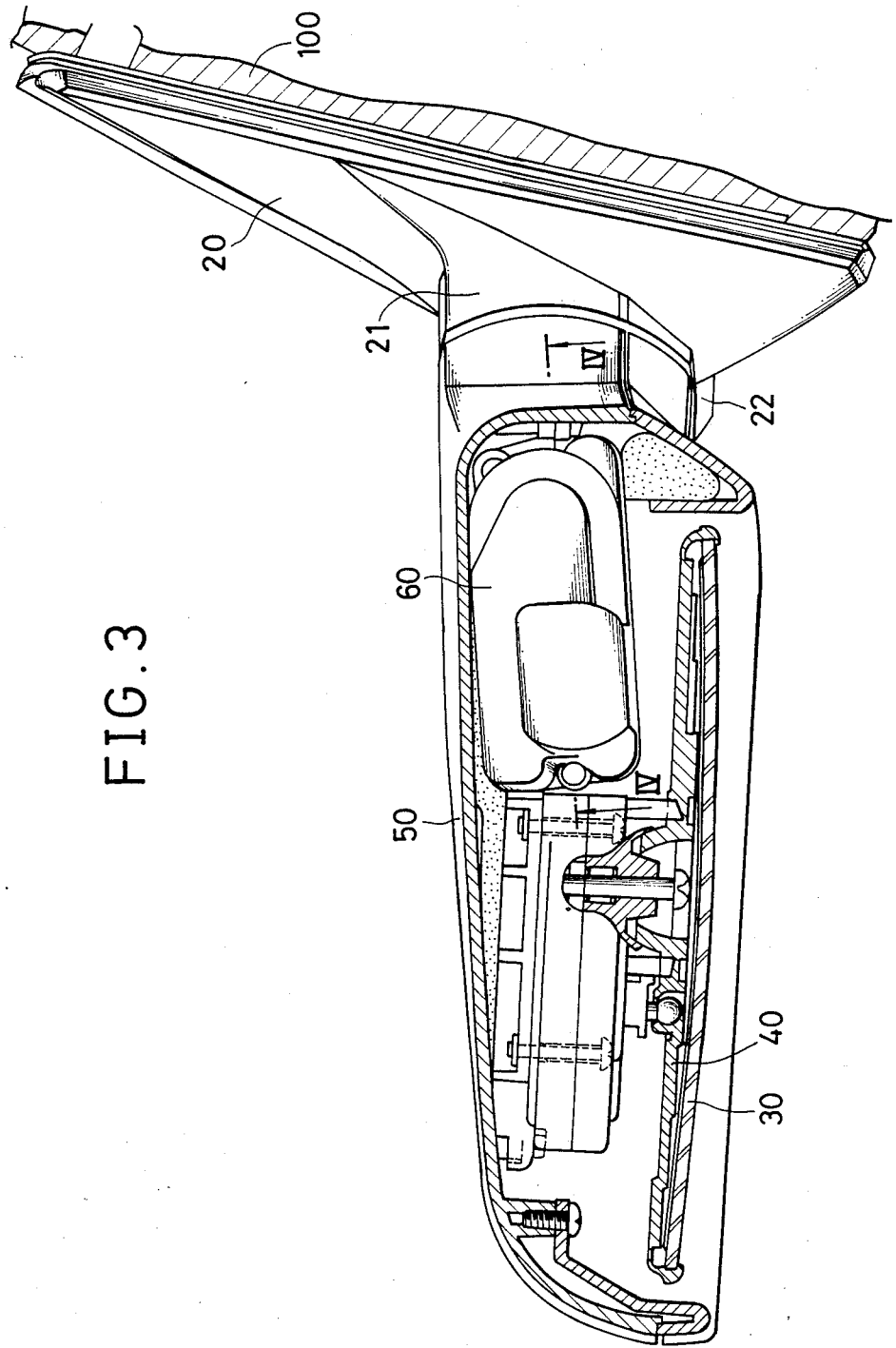
FIG. 3 is a plan showing an example of the door mirror of the electrically swingable type according to the present invention partially sectioned.

An example of the door mirror according to the present invention comprises a base 20 attached to the side of a door 100, a mirror body 40 for holding a mirror 30, and a mirror housing 50 for holding the mirror body 40 in such a way that the mirror body 40 can be adjusted of its angle, wherein the mirror housing 50 can be swung in the horizontal direction by means of a driver section 60, as shown in FIG. 3.

The base 20 is L-shaped comprising a vertical section 21 arranged along the side of the door 100 and a horizontal section 22 continuous from the lower end of the vertical section 21 and projected sideward the door 100. The mirror housing 50 is attached onto the horizontal section 22. That face of the vertical section 21 which is opposed to the mirror housing 50 is curved like a semi-circle drawn round so that the mirror housing 50 is swung, while the opposed face of the mirror housing 50 is also curved corresponding to the curved face of the vertical section 21. This enables the mirror housing 50 to be smoothly swung while it being kept adjacent to the base 20.

Figure 4:
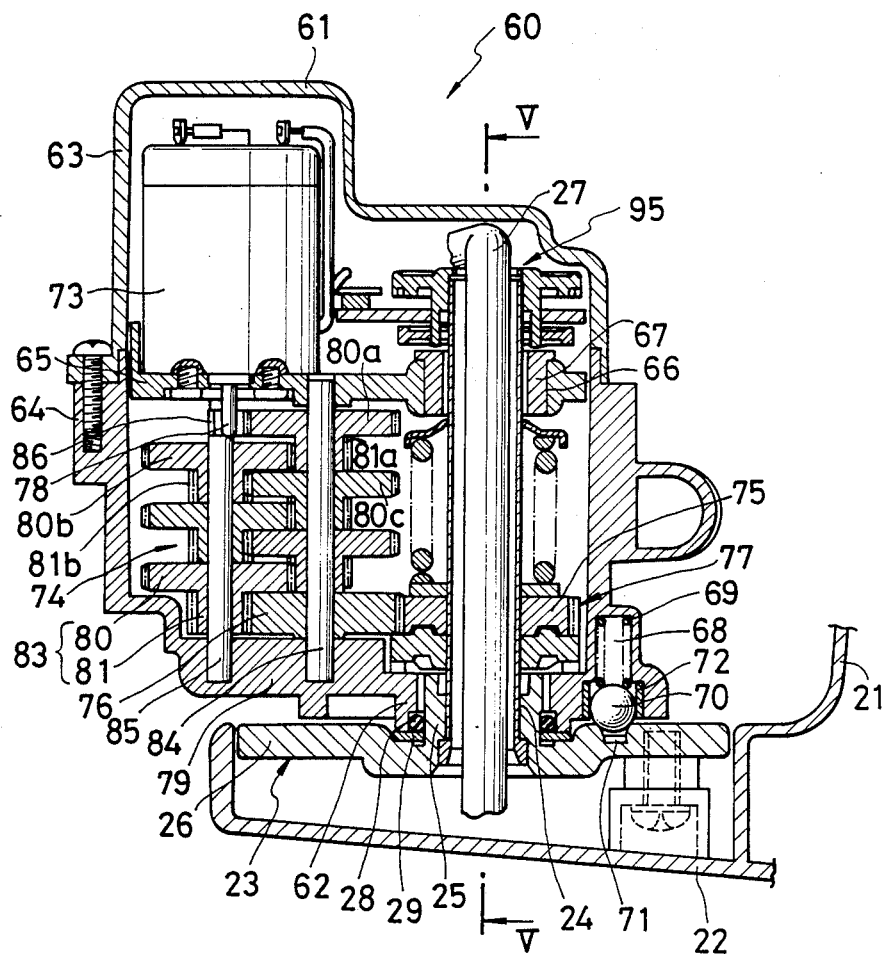
FIG. 4 is a sectional view taken along a line IV—IV in FIG. 3.
Figure 5:
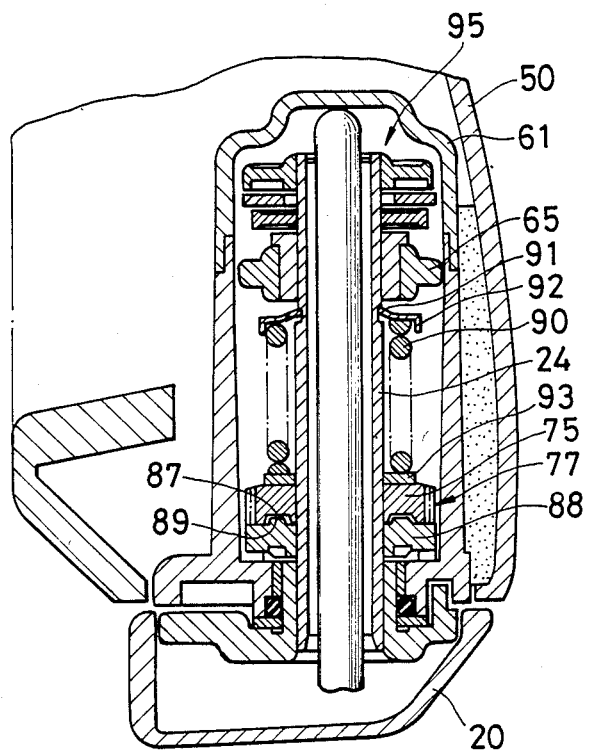
FIG. 5 is a sectional view taken along a line V—V in FIG. 4.

As shown in FIGS. 4 and 5, a center shaft 24 is erected from the horizontal section 22 of the base 20 through a shaft holder 23.

The shaft holder 23 includes a cylindrical shaft section 25 and a flange section 26 extending outward from the base of the cylindrical shaft section 25. The shaft holder 23 is fixed to the base 20 by attaching the flange section 26 to the horizontal section 22 by means of screws.

The center shaft 24 is pressed into the cylindrical shaft section 25 of the shaft holder 23 at the lower end thereof and thus held vertical on the horizontal section 22 of the base 20. The center shaft 24 is substantially cylindrical and a cord 27 is passed through the inside of the center shaft 24.

A cylindrical bearing section 62 projected from the bottom of a case 61 in which the driver system is housed is rotatably fitted onto the cylindrical shaft section 25 of the shaft holder 23 through a ring 28 and a washer 29. More specifically, the O-ring 28 is fitted into a ring-shaped groove formed on the lower inner wall of the cylindrical bearing section 62 of the case 61 while the washer 29 is closely fitted onto the cylindrical shaft section 25 of the shaft holder 23. Therefore, lubricating oil in the case 61 does not leak outside because it is stopped by the O-ring 28 and washer 29.

The case 61 is arranged freely rotatable in relation to the center shaft 24 and the mirror housing 50 is attached to this case 61. The mirror housing 50 can be thus freely swung round the center shaft 24.

The case 61 comprises an upper half 63 and a lower half 64 which is capped and screwed on the upper half 63 at the final stage of assembly, and an intermediate wall 65 made of resin is pressed into the case 61 to locate at that area of the case 61 where the upper and lower halves 63 and 64 are connected to each other to form the case 61. The intermediate wall 65 is provided with a hole 66 into which a bush 67 is fitted to support the upper portion of the center shaft 24. Therefore, the case 61 is supported at the lower portion thereof by the cylindrical shaft section 25 of the shaft holder 23 and at the upper portion thereof by the bush 67 in the intermediate wall 65. In other words, the case 61 is supported at both ends thereof to prevent the mirror housing 50 from resonating with the vibration of the car body.

The case 61 is provided with a positioning system for holding the case 61 at a certain position relative to the center shaft 24. This positioning system comprises a recess 68 formed on the bottom of the lower half 64, a compression coil spring 69 housed in the recess 68, and a steel ball 70 arranged in the open side of the recess 68. The steel ball 70 is pressed into a recess 71 on the upper face of the flange section 26 of the shaft holder 23 by means of the compression coil spring 69 so that the case 61 or mirror housing 50 can be held at its swung position. Three positioning systems of this kind are arranged on the shaft holder 23 round the center shaft 24, well balancing between the case 61 and the flange section 26. A bush 72 is fitted into the open side of the groove 68 to guide the steel ball 70.

The case 61 is also provided with a driver system for swinging the case 61 and mirror housing 50 round the center shaft 24. The driver system includes a drive motor 73, a speed reduction system 74 connected to the drive motor 73, planet gear 76 rotated by the drive motor 73 through the speed reduction system 74 and engaged with a sun gear 75 fixed to the center shaft 24, and a clutch system 77 related to the sun gear 75.

The drive motor 73 is located on the intermediate wall 65 of the case 61 and attached to it by means of screws with its rotating shaft 78 extending into the lower half 64 through a shaft hole in the intermediate wall 65.

The speed reduction system 74 is located between the intermediate wall 65 and a bottom 79 of the lower half 64 and includes a first gear group comprising three stepped gears 83 and a planet gear 76 rotatably attached to a first shaft 84 in series and a second gear group comprising three same stepped gears 83 rotatably attached to a second shaft 85 in series, each of said three stepped gears 83 being a combination of large-diameter gear 80 and small-diameter gear 81 coaxially connected to each other and said second shaft 85 being parallel to the first shaft 84. Each of the first and second shafts 84 and 85 is fixed to the intermediate wall 65 and the bottom 79 of the lower half 64 at its upper and lower ends.

The uppermost large-diameter gear 80a in the first gear group is engaged with a pinion 86 fixed to the rotating shaft 78 of the drive motor 73. The uppermost small-diameter gear 81a in the first gear group is engaged with the uppermost large-diameter gear 80b in the second gear group, the uppermost small-diameter gear 81b in the second gear group with the large-diameter gear 80c of the second stage in the first gear group, and the other gears in the first gear group are successively engaged with those in the second gear group in the same manner as described above. And the lowest small-diameter gear 81 in the second gear group is engaged with the lowest planet gear 76 in the first gear group, while the planet gear 76 is engaged with the sun gear 75 which is fixed to the center shaft 24 and which serves as a part of the clutch system 77.

According to the clutch system 77, concaves 87 on the underside of the sun gear 75 are engaged with convexes 89 on the upper face of a disk-like fixing member 88, which is located under the sun gear 75 and fixed to the center shaft 24, by means of a compression coil spring 90 fitted onto the center shaft 24. Three concaves 87 are provided on the underside of the sun gear 75 along the peripheral rim of the gear 75 with an interval of 120° interposed between the adjacent concaves and same thing can be said about the convexes 89 on the upper face of the fixing member 88. These concaves and convexes 87 and 89 are usually engaged with one another by means of the coil spring 90 to keep the sun gear 75 unrotatable but when overload is added from the side of the planet gear 76 to the sun gear 75, the concaves 87 of the sun gear 75 are released from the convexes 89 of the fixing member 88, thereby enabling the sun gear 75 to run idle in relation to the fixing member 88.

Figure 6:
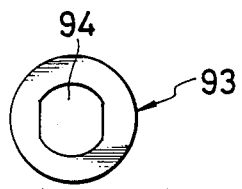
FIG. 6 is a plan showing a washer employed by the door mirror of the present invention.

The coil spring 90 is stretched between a push nut 92 pressed into a ring-shaped groove 91, which is located just under the intermediate wall 65 and formed round the center shaft 24, and a washer 93 unrotatably fitted onto that portion of the center shaft 24 which is located just above the upper face of the sun gear 75. As shown in FIG. 6, the washer 93 has a hole 94 shaped like a circle whose upper and lower portions are cut off, and that portion of the center shaft 24 onto which the washer 93 is fitted is shaped similarly to the hole 94 of the washer 93. When the washer 93 is fitted onto this portion of the center shaft 24, therefore, the washer 93 cannot rotate round the center shaft 24. Even when the sun gear 75 rotates, therefore, neither of the spring 90 nor the push nut 92 is rotated. If the push nut 92 is rotated, it will come out of the groove 91 as time goes by because of friction created between the push nut 92 and the center shaft 24. As the result, the intermediate wall 64 will be lifted by the spring 90, thereby causing the clutch system 77 to be wrongly operated.

The drive motor 73 is controlled by a switch system 95 arranged on the top of the center shaft 24 and the switch system 95 is operated by an operating switch arranged adjacent to the driver's seat through the cord 27.

As apparent from the above, the door mirror of the electrically swingable type according to the present invention can provide various excellent characteristics and merits, and it should be understood that various changes and modifications can be made without departing from the spirit and scope of the present invention.

What is claimed is:

1. A door mirror of the electrically swingable type comprising a base fixed to a door of a vehicle, a center shaft nonrotatably attached to the base, a mirror housing pivoted on and rotated round the center shaft, a mirror housed in the mirror housing in such a way that its angle can be adjusted in the mirror housing, a sun gear attached to the center shaft, and a driver system having a planet gear engaged with the sun gear to swing the mirror housing relative to the base through the sun gear;

wherein said mirror housing is supported at both ends of the center shaft by intermediate and bottom walls of a case in which the drive system in the mirror housing is housed;

wherein said case in which the driver system is housed has a cylindrical bearing section which is projected from the bottom of the case and rotatably fitted onto a cylindrical shaft section erected from the base, a ring-shaped groove is formed on the inner face of the cylindrical bearing section at the lower end thereof, an O-ring is fitted into the groove, closely contacting the outer circumference of the cylindrical shaft section, and a washer is then attached to the open side of the groove from below.

2. A door mirror of the electrically swingable type comprising a base fixed to a door of a vehicle, a center shaft nonrotatably attached to the base, a mirror housing pivoted on and rotated round the center shaft, a mirror housed in the mirror housing in such a way that its angle can be adjusted in the mirror housing, a sun gear attached to the center shaft, and a driver system having a planet gear engaged with the sun gear to swing the mirror housing relative to the base through the sun gear, wherein said mirror housing is supported at both ends of the center shaft by intermediate and bottom walls of a case in which the drive system in the mirror housing is housed;

said door mirror further comprising a clutch system including the sun gear rotatably fitted onto the center shaft, a fixing member fixed to the center shaft, engaging sections formed on those faces of the sun gear and fixing member which are opposed to each other, a washer nonrotatably fitted onto the center shaft and mounted on the sun gear, and a compression coil spring stretched between the washer and a push nut fixed to the upper portion of the center shaft.

3. A door mirror of electrically swingable type comprising:
- a base fixed to a door of a vehicle;
- a mirror housing for housing a mirror;
- a case attached to the mirror housing and containing a drive system having a planet gear for swingably driving the mirror housing with respect to the base, said case including an intermediate wall and a bottom wall;
- a center shaft nonrotatably attached to the base and for supporting the case at its both ends and at the intermediate and bottom walls of the case; and
- a sun gear attached to the center shaft and engaged with the planet gear so that the mirror housing swings with respect to the base.

4. A door mirror according to claim 3, wherein said base comprises a cylindrical shaft section for fixedly supporting the center shaft therein, said case includes a cylindrical bearing section for rotatably engaging with the cylindrical shaft section of the base to form a ring-shaped groove, an O-ring and a washer being fitted into the ring-shaped groove.

5. A door mirror according to claim 3, said sun gear being rotatably fitted to the center shaft and further comprising a clutch mechanism including a member fixed to the center shaft and engaging means, formed on cooperating surfaces of said member and the sun gear and including by a coil spring, for selectively engaging the sun gear with the center shaft.

6. A door mirror according to claim 3, wherein said drive system includes;
- a drive motor;
- a pinion gear fixed to a rotating shaft of the drive motor; and
- a plurality of stepped gears, each having a large diameter gear and a small diameter gear, the large diameter gear of the first stepped gear being engaged with the pinion gear, the small diameter gear of each stepped gear being engaged with the large diameter gear of the next stepped gear and the small diameter gear of the final stepped gear being engaged with the planet gear.

* * * * *